United States Patent [19]

Arai et al.

[11] Patent Number: 4,724,156
[45] Date of Patent: Feb. 9, 1988

[54] METHOD OF MANUFACTURING MAGNETIC RECORDING MEDIUM

[75] Inventors: Yoshihiro Arai; Tadashi Yasunaga; Ryuji Shirahata, all of Kanagawa, Japan

[73] Assignee: Fuji Photo Film Co., Ltd., Japan

[21] Appl. No.: 901,976

[22] Filed: Sep. 2, 1986

Related U.S. Application Data

[63] Continuation of Ser. No. 767,779, Aug. 20, 1985, abandoned.

[30] Foreign Application Priority Data

Aug. 24, 1984 [JP] Japan ............... 59-176166

[51] Int. Cl.⁴ .............................. H01F 10/02
[52] U.S. Cl. ....................... 427/38; 427/42; 427/128
[58] Field of Search ............ 427/38, 42; 1/128

[56] References Cited

U.S. PATENT DOCUMENTS 4,557,944 10/1985 Arai et al. .................. 427/39

Primary Examiner—Bernard D. Pianalto
Attorney, Agent, or Firm—Gerald J. Ferguson, Jr.; Michael P. Hoffman; Michael J. Foycik, Jr.

[57] ABSTRACT

In manufacturing a magnetic recording medium, a flow of iron vapor is formed in a nitrogen atmosphere and iron vapor particles in the flow of iron vapor are deposited on a non-magnetic substrate together with nitrogen particles to form an iron nitride film thereon. Before deposition on the non-magnetic substrate, the nitrogen particles are ionized by an ion beam generating means and the iron vapor particles are ionized by a high-frequency discharge.

1 Claim, 1 Drawing Figure

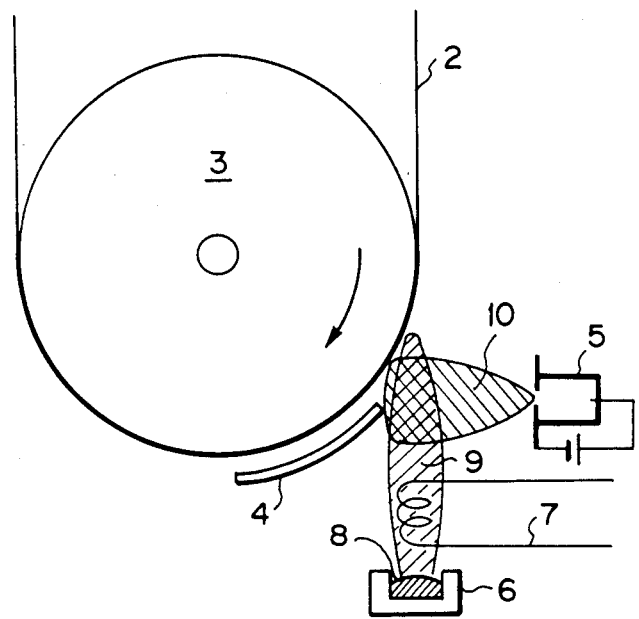

METHOD OF MANUFACTURING MAGNETIC RECORDING MEDIUM

This application is a continuation-in-part of Ser. No. 767,779, filed Aug. 20, 1985, now abandoned.

BACKGROUND OF THE INVENTION

1. Field of the Invention

This invention relates to a method of manufacturing a magnetic recording medium, and more particularly to a method of manufacturing a non-binder type magnetic recording medium useful as a video recording tape and the like.

2. Description of the Prior Art

As a magnetic recording medium, there have been in wide use coating type magnetic recording media which are formed by applying a dispersion of powdered magnetic material in an organic binder to a non-magnetic substrate and drying it. The coating type magnetic recording media are not suitable for high density recording since, as the magnetic material are used, metal oxides the saturation magnetization of which is smaller than that of ferromagnetic metals. Further, a coating type magnetic recording medium is disadvantageous in that the manufacturing process is complicated and large scale equipment is required for recovery of solvents and prevention of environmental pollution.

In response to strong demand for high density recording, there have been developed non-binder type magnetic recording media having, as the magnetic recording layer, a ferromagnetic film formed by a vapor deposition process such as vacuum deposition, sputtering, ion plating or the like, or a plating process such as electroplating or electroless plating. The non-binder type magnetic recording medium is advantageous over the coating type magnetic recording medium in that the recording layer can be formed of ferromagnetic metal having a saturation magnetization larger than that of metal oxide used for forming the recording layer of the coating type recording medium and can be formed without nonmagnetic material such as the binder being included in the recording layer, and accordingly the recording layer of the non-binder type magnetic recording medium has a higher magnetic coercivity and is thinner compared with the recording layer of the coating type magnetic recording medium. Further, the non-binder type magnetic recording medium can be manufactured relatively simply and is free from environmental pollution due to organic solvents. In particular, the recording layer of the non-binder type recording medium can be thinner than that of the coating type recording medium by a factor of ten, therefore it has been attracting attention as a recording medium for high density magnetic recording.

However, the magnetic film (recording layer) of the non-binder type magnetic recording medium is apt to corrode and is inferior to the recording layer of the coating type magnetic recording medium in resistance to weathering and corrosion prevention properties. In particular, when the recording layer is being contacted by a magnetic head during recording/reproduction, any slight corrosion on the surface of the recording layer can cause clogging with the magnetic head, which can result in damage to the recording medium and the magnetic head. When corrosion of the recording layer increases, the recording layer is apt to peel off, causing loss of recorded information.

Further, there is a problem with durability of the non-binder type magnetic recording medium. That is, the nonbinder type magnetic recording medium is inferior to the coating type magnetic recording medium in still-mode durability as used in a video tape recorder, and therefore there has been strong demand for improvement thereof.

There have been proposed various methods of improving the resistance to weathering and durability of the non-binder type magnetic recording medium. For example, it is proposed in Japanese Unexamined Patent Publication No. 50(1975)-33806 to surface-nitride the non-binder type magnetic recording medium by ion plating process. In Japanese Unexamined Patent Publication No. 53(1978)-30304, there is disclosed a method in which silicon nitride film is formed on the surface of the non-binder type magnetic recording medium by sputtering. In Japanese Unexamined Patent Publication No. 53(1978)-85403 is disclosed a method in which a magnetic film is exposed to discharge in a nitrogen atmosphere to form a non-magnetic surface layer. Further, in Japanese Unexamined Patent Publication No. 54(1979)-143111, there is disclosed a method in which a metal nitride film is formed on a magnetic metal film. However, none of these methods is satisfactory in that the protective layer formed by the various methods described above must be large in thickness in order to achieve sufficient resistance to weathering and sufficient durability. When the protective layer is large in thickness, the electromagnetic transduction properties are significantly deteriorated and the advantage of the non-binder type magnetic recording medium is lost.

A non-binder type magnetic recording medium having a magnetic film of iron nitride and iron, or of iron nitride, as disclosed in European Patent No. 8328 and Japanese Unexamined Patent Publication No. 59(1984)-87809 has attracted attention because of its superior resistance to weathering, but is lacking in magnetic properties and durability.

A magnetic recording medium having an iron nitride film layer as the recording layer can be manufactured by depositing iron or iron compound on a non-magnetic substrate in a nitrogen atmosphere. However, iron nitride cannot be sufficiently formed by simply introducing nitrogen into the deposition apparatus through a nozzle since the energy of the nitrogen particles is smaller by more than a factor of ten than the energy of the particles to be deposited, and accordingly it has been as difficult to efficiently form the iron nitride film layer as known magnetic film layers.

SUMMARY OF THE INVENTION

In view of the foregoing observations and description, the primary object of the present invention is to provide a method of manufacturing a magnetic recording medium having an iron nitride film layer which exhibits excellent resistance to weathering and durability.

The method in accordance with the present invention is characterized in that a iron nitride film layer is deposited on a non-magnetic substrate by use of nitrogen ions ionized by an ion beam generating source and vapor particles of iron ionized by a high-frequency discharge.

As the ion beam generating source, any means may be employed in the present invention so long as it can essentially ionize nitrogen gas particles. For example, the ion beam generating source may be of a thermoionic excitation type, or a microwave excitation type. Irradiation of the ion beam may be conducted in any position where vapor particles exist before adhering to the non-magnetic substrate.

The high-frequency discharge may be provided by any suitable means which can essentially ionize iron.

In accordance with the present invention, the iron nitride film layer preferably contains 30 to 75 atomic % iron component and 5 to 40 atomic % nitrogen component. The iron component need not be whole nitrided. Metal iron and/or iron oxide may be contained in the iron component.

Preferably, the non-magnetic substrate is of a plastic base material such as polyethylene terephthalate, polyimide, polyamide, polyvinyl chloride, cellulose triacetate, polycarbonate or polyethylene naphthalate.

There may be formed on the magnetic film layer a lubricant layer such as of fatty acid the carbon number of which is 12 to 18 (R1COOH, R1 being an alkyl or alkylene group having 11 to 17 carbon atoms), metallic salts of such fatty acid, silicone oils, at least one of fatty esters consisting of monobasic fatty acid the carbon number of which is 2 to 20 and monovalent alcohols the carbon number of which is 3 to 12, and the like. The lubricant is preferably provided on the magnetic film in an amount of 0.5 to 20 mg/m$^2$. The lubricant may be directly coated on the magnetic film or may be transferred to the magnetic film after being first coated on a support.

If desired, a back layer may be provided on the rear side of the substrate. Also, if desired, an organic or inorganic layer may be formed between the substrate and the magnetic film.

BRIEF DESCRIPTION OF THE DRAWING

The single FIGURE is a schematic view showing a part of a metallizing apparatus used for preparing a magnetic recording tape in accordance with an embodiment of the present invention.

DETAILED DESCRIPTION OF THE INVENTION

The present invention will now be described in more detail with reference to an example.

EXAMPLE

By using the take-up type deposition apparatus shown in FIG. 1, a magnetic film of iron nitride was formed on a 9.5 μm thick polyethylene terephthalate substrate by oblique incidence ion plating, thereby preparing a magnetic recording tape. That is, a strip-like substrate (polyethylene terephthalate substrate) 2 was transferred along a cooling can 3. Iron was loaded, as a vapor material 8, into a crucible 6 heated by a suitable heating means, generating vapor particles. Nitrogen gas was introduced into the deposition apparatus so that partial pressure of nitrogen gas ($P_{N2}$) became $2 \times 10^{-3}$ to $8 \times 10^{-5}$ Torr. A part of the nitrogen particles were ionized by an ion beam generating source 5 to form a nitrogen ion beam 10. A part of the vapor particles of iron were ionized by a radio-frequency discharge coil 7 to form an iron ion beam 9. The radio-frequency discharge coil 7 was connected to a power source (not shown) by way of a matching box (not shown) so that a high frequency power of 1.2 KW at 13.56 MHZ was applied thereto. The iron ion beam 9 and the nitrogen ion beam 10 thus obtained were ion-plated on the substrate 2. The incident angle was controlled to 60° by a shield mask 4.

Resistance to weathering, durability, and magnetic properties of the magnetic recording tapes thus obtained were measured. At the same time, resistance to weathering, durability and magnetic properties of a conventional ferromagnetic film type magnetic recording tape having a ferromagnetic recording film layer of $Co_{0.8}Ni_{0.2}$ were measured for the purpose of comparison. The comparative tape was prepared by use of the same deposition apparatus and incidence angle as used in the example, though deposition was effected by use of a Pierce type electron gun without conducting the ion plating by the RF coil or irradiation of the ion beam. The resistance to weathering was evaluated in terms of the state of corrosion after the magnetic recording tapes were placed in a dew-cycle test type weatherometer (Yamazaki Seiki Kenkyusho, Model E-12WG) for twenty four hours. The state of corrosion was evaluated by use of a five-grade system. The durability was evaluated in terms of damage to the magnetic film surface inflicted by the magnetic head after the tapes were operated in still mode in a VHS type video tape recorder for ten minutes. The damage to the magnetic film surface was evaluated by use of a five-grade system, as observed by microscope.

As for the magnetic properties, the magnetic coercivity Hc and the residual magnetization ∅r were measured by a sample vibration type fluxmeter (Toei Kogyo, Model VSM-3). The results are shown in the following table.

| Sample | Magnetic properties | Resistance to* weathering | Durability* |
|---|---|---|---|
| Example | Hc = 830 oe<br>∅ = 2700 gauss | 5 | 5 |
| Comparative | Hc = 900 oe<br>∅ = 4800 gauss | 1 | 2 |

*Grades, one to five, grade 5 being the best.

As can be understood from the above table, the recording medium in accordance with the present invention is superior to the conventional one in resistance to weathering and durability.

We claim:
1. A method of manufacturing a magnetic recording medium in which a magnetic iron nitride film is deposited on a non-magentic substrate, comprising the steps of:
   (a) generating an iron vapor,
   (b) ionizing nitrogen by an ion beam to form a nitrogen ion beam,
   (c) ionizing said iron vapor by high frequency discharge to form an iron ion beam which intersects said nitrogen ion beam of (b) and,
   (d) thus forming said iron nitride film on said non-magnetic substrate.

* * * * *